(12) United States Patent
Ozawa et al.

(10) Patent No.: US 11,465,496 B2
(45) Date of Patent: Oct. 11, 2022

(54) POWER UNIT OF UTILITY VEHICLE

(71) Applicant: KAWASAKI MOTORS, LTD., Akashi (JP)

(72) Inventors: Shouji Ozawa, Kakogawa (JP); Yoshimoto Matsuda, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 439 days.

(21) Appl. No.: 16/554,915

(22) Filed: Aug. 29, 2019

(65) Prior Publication Data
US 2021/0061097 A1   Mar. 4, 2021

(51) Int. Cl.
| | | |
|---|---|---|
| *B60K 25/06* | (2006.01) | |
| *F16D 21/00* | (2006.01) | |
| *F16H 37/02* | (2006.01) | |
| *F16H 37/06* | (2006.01) | |
| *F16H 3/093* | (2006.01) | |

(52) U.S. Cl.
CPC ............. *B60K 25/06* (2013.01); *F16D 21/00* (2013.01); *F16H 3/093* (2013.01); *F16H 37/027* (2013.01); *F16H 37/065* (2013.01); *F16H 2702/06* (2013.01)

(58) Field of Classification Search
CPC ......... B60K 25/06; F16D 21/00; F16H 3/093; F16H 37/021; F16H 37/027; F16H 37/065; F16H 2702/06; B60Y 2200/124; B60Y 2200/20; B60Y 2400/72
See application file for complete search history.

(56) References Cited

U.S. PATENT DOCUMENTS

| | | | | |
|---|---|---|---|---|
| 5,152,361 A | * | 10/1992 | Hasegawa | F16H 37/022 180/230 |
| 6,184,603 B1 | * | 2/2001 | Hamai | B60W 20/00 903/952 |
| 6,447,417 B2 | * | 9/2002 | Kanehisa | B60K 17/06 903/905 |
| 6,634,247 B2 | * | 10/2003 | Pels | B60K 6/40 74/330 |

(Continued)

FOREIGN PATENT DOCUMENTS

| | | | | |
|---|---|---|---|---|
| JP | | 60184758 A | * | 9/1985 |
| JP | | 2010144894 A | * | 7/2010 |
| JP | | 2017219138 A | * | 12/2017 |

*Primary Examiner* — Laura Freedman
(74) *Attorney, Agent, or Firm* — Alleman Hall Creasman & Tuttle LLP

(57) ABSTRACT

A power unit of a utility vehicle includes: a power source for travel of the utility vehicle; a continuously variable transmission; a reduced-speed shaft disposed parallel to a drive shaft of the power source and coaxially with a CVT input shaft of the continuously variable transmission; speed-reduction gears that transmit rotational power of the drive shaft to the reduced-speed shaft; and an electricity generator mounted on a shaft assembly including the CVT input shaft and the reduced-speed shaft. The drive shaft, the shaft assembly, the CVT input shaft, and the CVT output shaft extend in a first direction. The electricity generator is aligned with the power source in a second direction perpendicular to the first direction, and the location of the electricity generator in the first direction overlaps with the location of the power source in the first direction.

10 Claims, 8 Drawing Sheets

(56) References Cited

U.S. PATENT DOCUMENTS

| | | | | |
|---|---|---|---|---|
| 6,736,753 B2* | 5/2004 | Endo | B60K 6/44 | 477/3 |
| 7,246,672 B2* | 7/2007 | Shirai | B60W 20/00 | 903/910 |
| 7,427,248 B2* | 9/2008 | Chonan | F16H 57/0415 | 474/93 |
| 7,470,209 B2* | 12/2008 | Holmes | B60W 30/1882 | 475/275 |
| 7,510,199 B2* | 3/2009 | Nash | B60K 6/52 | 180/311 |
| 7,637,836 B2* | 12/2009 | Watanabe | B60K 6/387 | 475/5 |
| 7,736,266 B2* | 6/2010 | Huang | B60K 6/48 | 475/5 |
| 7,819,212 B2* | 10/2010 | Kawasaki | B60W 10/107 | 477/3 |
| 7,845,444 B2* | 12/2010 | Kidokoro | B60K 6/405 | 180/65.265 |
| 8,033,939 B2* | 10/2011 | Tabata | B60W 20/00 | 475/5 |
| 8,147,366 B2* | 4/2012 | Kawasaki | B60K 1/02 | 180/65.265 |
| 8,328,672 B2* | 12/2012 | Akutsu | B60W 10/08 | 475/5 |
| 8,602,933 B2* | 12/2013 | Kawasaki | B60K 6/543 | 475/5 |
| 8,613,336 B2 | 12/2013 | Deckard et al. | | |
| 9,242,544 B2* | 1/2016 | Kochidomari | B60K 7/0007 | |
| 9,358,971 B2* | 6/2016 | Oki | B60W 20/00 | |
| 9,458,909 B2* | 10/2016 | Sugimoto | F16H 57/043 | |
| 9,527,375 B2* | 12/2016 | Clark | B60K 6/26 | |
| 9,545,842 B2* | 1/2017 | Kawasaki | B60K 6/42 | |
| 9,616,739 B2* | 4/2017 | Hwang | F16H 37/065 | |
| 9,873,423 B2* | 1/2018 | Baba | B60K 6/543 | |
| 9,932,039 B2* | 4/2018 | Iketomi | B60W 10/111 | |
| 10,220,696 B2* | 3/2019 | Uezu | B60K 17/34 | |
| 10,525,972 B2* | 1/2020 | Inoue | B60W 10/107 | |
| 10,576,965 B2* | 3/2020 | Katakura | B60K 6/543 | |
| 10,605,344 B2* | 3/2020 | Mehlis | F16H 37/022 | |
| 10,807,458 B2* | 10/2020 | Nishizawa | B60K 6/387 | |
| 10,900,563 B2* | 1/2021 | Matsuda | B60K 17/04 | |
| 10,913,459 B2* | 2/2021 | Itoo | B60K 17/344 | |
| 10,914,349 B1* | 2/2021 | Ozawa | F16H 37/021 | |
| 11,155,155 B2* | 10/2021 | Cho | B60K 6/48 | |
| 2021/0062901 A1* | 3/2021 | Ozawa | F16H 37/084 | |
| 2021/0138889 A1* | 5/2021 | Köpfler | B60K 6/365 | |

* cited by examiner

POWER UNIT OF UTILITY VEHICLE

BACKGROUND OF THE INVENTION

Field of the Invention

The present disclosure relates to a power unit of a utility vehicle.

Description of the Related Art

U.S. Pat. No. 8,613,336 B2 discloses a utility vehicle configured to travel on uneven terrains. Such a utility vehicle generally includes a power unit mounted in a vehicle body of the vehicle, the power unit including an engine and a continuously variable transmission (CVT).

Depending on the design requirements for the utility vehicle, the size of the power unit in a direction in which shafts of the power unit extend may be limited. In this case, it is conceivable to change the layout of the components of the power unit. However, if an electricity generator coupled to an end of the crankshaft of the engine is translocated, the behavior of the utility vehicle needs to be considered to avoid adverse effects on the electricity generator.

SUMMARY OF THE INVENTION

An object of the present disclosure is to increase the service life of an electricity generator included in a power unit of a utility vehicle while preventing size increase of the power unit.

A power unit of a utility vehicle according to an aspect of the present disclosure includes: a power source for travel of the utility vehicle, the power source including a drive shaft that outputs rotational power; a continuously variable transmission including a CVT input shaft that receives the rotational power input from the drive shaft of the power source, a CVT output shaft that outputs the rotational power, a drive pulley mounted on the CVT input shaft, a driven pulley mounted on the CVT output shaft, and a belt wound around the drive pulley and the driven pulley; a reduced-speed shaft disposed parallel to the drive shaft of the power source and coaxially with the CVT input shaft; speed-reduction gears that transmit rotational power of the drive shaft to the reduced-speed shaft; and an electricity generator mounted on a shaft assembly including the CVT input shaft and the reduced-speed shaft, wherein the drive shaft, the shaft assembly, the CVT input shaft, and the CVT output shaft extend in a first direction, the electricity generator is aligned with the power source in a second direction perpendicular to the first direction, and the location of the electricity generator in the first direction overlaps with the location of the power source in the first direction.

With the above configuration, the electricity generator is disposed with high space efficiency, and the power unit can be made compact in the first direction (the direction in which the shafts extend). Additionally, since the electricity generator is disposed upstream of the continuously variable transmission in the route of power transmission from the power source to a drive wheel, back torque exerted on the drive wheel from the ground surface is absorbed by the belt of the continuously variable transmission, and transmission of the back torque to the electricity generator can be reduced. This makes it possible to increase the service life of the electricity generator while preventing size increase of the power unit.

The above and further objects, features and advantages of the present disclosure will be more apparent from the following detailed description of preferred embodiments with reference to the accompanying drawings.

DETAILED DESCRIPTION OF THE EMBODIMENTS

Hereinafter, embodiments will be described with reference to the drawings.

First Embodiment

Figure 1:
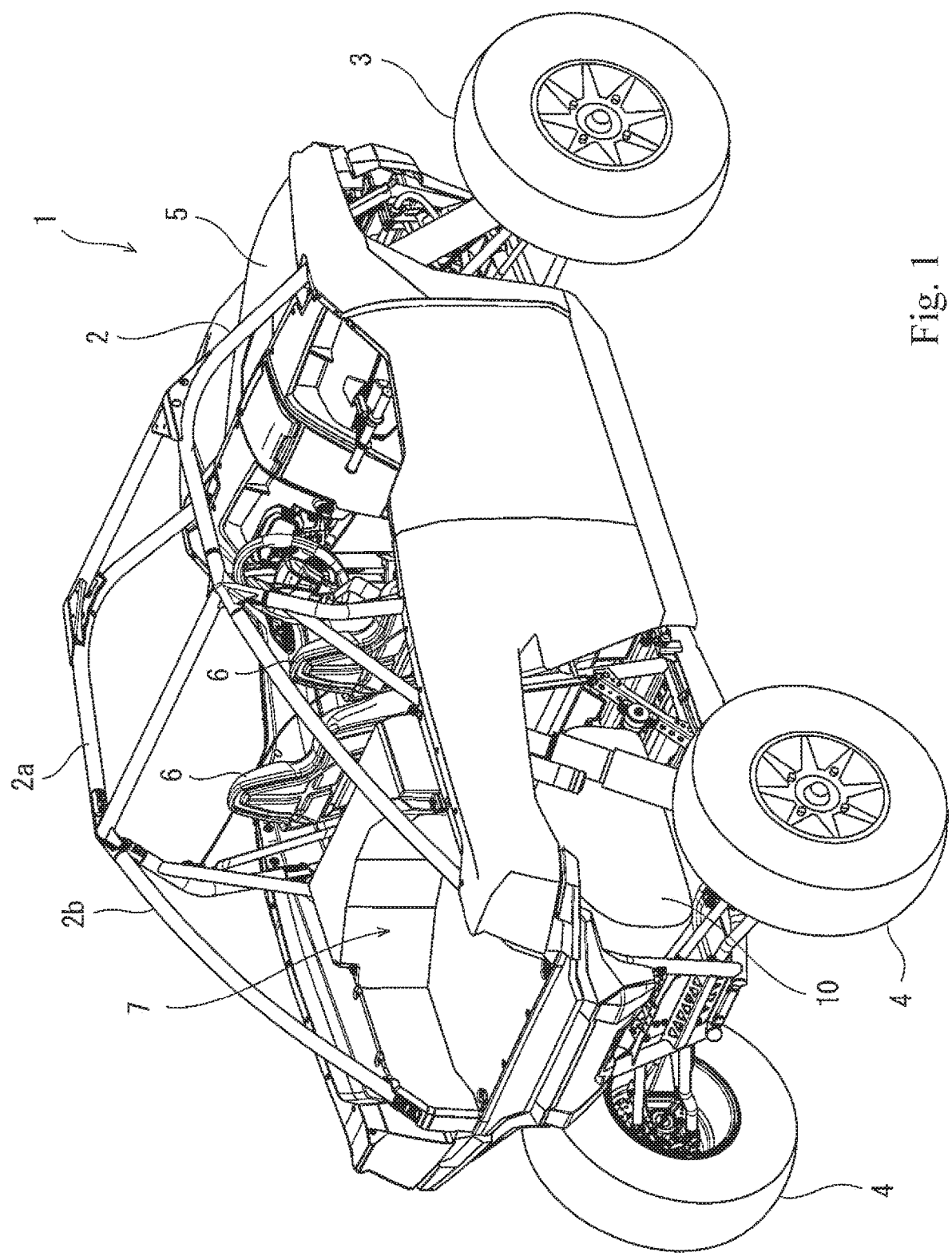
FIG. 1 is a perspective view of a utility vehicle according to a first embodiment.

FIG. 1 is a perspective view of a utility vehicle 1 according to a first embodiment. As shown in FIG. 1, the utility vehicle 1 includes a pair of left and right front wheels 3 supported by a front portion of a vehicle body frame 2 and a pair of left and right rear wheels 4 supported by a rear portion of the vehicle body frame 2. The space between the left and right front wheels 3 is covered from above by a hood 5 made of resin. A pair of occupant seats 6 (driver seat and passenger seat) are disposed rearwardly of the hood 5 and located in the vicinity of the center of the vehicle body frame 2 in a forward/rearward direction.

The vehicle body frame 2 includes a cabin frame part 2a and a pair of left and right rear gusset frame parts 2b. The vehicle body frame 2 is a pipe frame constructed of a plurality of pipe members connected together. The cabin frame part 2a is formed to surround the occupant space in which the occupant seats 6 are disposed. The occupant space surrounded by the cabin frame part 2a is exposed to the outside of the vehicle. The rear gusset frame parts 2b connect an upper portion of the cabin frame part 2a to a rear portion of a rear frame part (not illustrated). A cargo carrier 7 forming a recessed cargo-carrying space is provided rearwardly of the occupant seats 6. Below the cargo carrier 7 is mounted a power unit 10 to be described later (the power unit 10 is omitted in FIG. 1). When the utility vehicle 1 is a two-wheel-drive vehicle, the rear wheels 4 are the drive wheels, and when the utility vehicle 1 is a four-wheel-drive vehicle, the front wheels 3 and the rear wheels 4 are the drive wheels.

Figure 2:
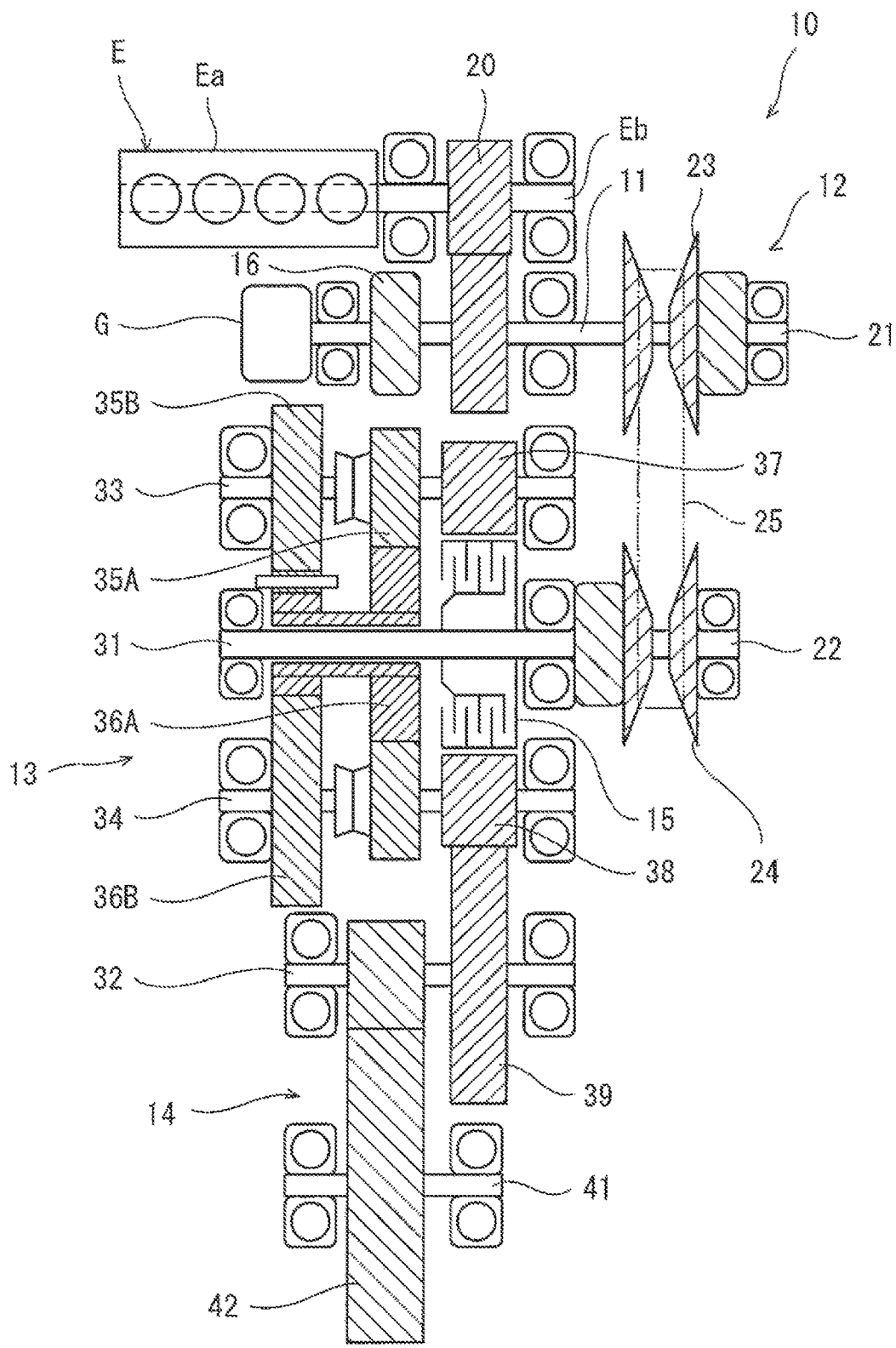
FIG. 2 is a developed view of a power unit of the utility vehicle shown in FIG. 1.

FIG. 2 is a developed view of the power unit 10 of the utility vehicle 1 shown in FIG. 1. As shown in FIG. 2, the power unit 10 includes an engine E (power source for travel of the utility vehicle), a reduced-speed shaft 11, a continuously variable transmission 12, a gear transmission 13, an output mechanism 14, a clutch 15, a pump 16, an electricity generator G, and a power unit case 17. The engine E is a multi-cylinder (e.g., four-cylinder) internal combustion engine. The engine E includes a cylinder unit Ea and a crankshaft Eb (drive shaft) located below the cylinder unit Ea. The crankshaft Eb extends, for example, in a leftward/rightward direction (first direction). The crankshaft Eb outputs rotational power generated by the cylinder unit Ea. An electric motor may be used as the power source instead of the engine (internal combustion engine).

The reduced-speed shaft 11 is disposed parallel to and rearwardly of the crankshaft Eb of the engine E. A speed-reduction gear pair 20 is mounted on the crankshaft Eb and the reduced-speed shaft 11 to transmit the rotation of the crankshaft Eb to the reduced-speed shaft 11 at a reduced rotational speed. The pump 16 is mounted on the reduced-speed shaft 11. That is, the pump 16 is driven by rotation of the reduced-speed shaft 11. The pump 16 mounted on the reduced-speed shaft 11 is located between the continuously variable transmission 12 and the electricity generator G described later. The pump 16 is, for example, an oil pump for delivering a lubricating oil for lubrication of the engine E and the continuously variable transmission 12. The location of the pump 16 in the leftward/rightward direction overlaps with the location of the crankshaft Eb in the leftward/rightward direction. Any part of the pump 16 does not project outwardly of the crankshaft Eb in the leftward/rightward direction. When the engine E is used as the power source, the pump 16 may be a water pump for cooling the engine E.

The electricity generator G is mounted on an end of the reduced-speed shaft 11, the end being remote from the continuously variable transmission 12. The electricity generator G is aligned with the engine E in the forward/rearward direction (second direction). The electricity generator G is disposed between the crankshaft Eb and the gear transmission 13 in the forward/rearward direction. The location of the electricity generator G in the leftward/rightward direction overlaps with the location of the crankshaft Eb in the leftward/rightward direction. Any part of the electricity generator G does not project outwardly of the crankshaft Eb in the leftward/rightward direction. The electricity generator G only needs to be mounted on a shaft assembly including the reduced-speed shaft 11 and a CVT input shaft 21 and may be mounted, for example, on the CVT input shaft 21.

The continuously variable transmission 12 is disposed outwardly of the engine E in the leftward/rightward direction. The continuously variable transmission 12 includes the CVT input shaft 21, a CVT output shaft 22, a drive pulley 23, a driven pulley 24, and a belt 25. The CVT input shaft 21 receives rotational power input from the crankshaft Eb. The CVT input shaft 21 is disposed coaxially with the reduced-speed shaft 11 and corotates with the reduced-speed shaft 11. The CVT input shaft 21 may be connected directly to the reduced-speed shaft 11, may be connected indirectly to the reduced-speed shaft 11, or may be formed integrally with the reduced-speed shaft 11.

The CVT output shaft 22 outputs rotational power to the gear transmission 13. The CVT input shaft 21 and the CVT output shaft 22 extend in the leftward/rightward direction. The drive pulley 23 is mounted on the CVT input shaft 21. The driven pulley 24 is mounted on the CVT output shaft 22. The belt 25 is wound around the drive pulley 23 and driven pulley 24. The belt 25 is made of, for example, a non-metallic material (such as rubber or resin).

The gear transmission 13 is aligned with the continuously variable transmission 12 in the leftward/rightward direction and aligned with the engine E in the forward/rearward direction. The gear transmission 13 is a dog clutch transmission. The gear transmission 13 includes a GT input shaft 31, a GT output shaft 32, a first GT intermediate shaft 33, a second GT intermediate shaft 34, first speed-change gear pairs 35A and 35B, second speed-change gear pairs 36A and 36B, a first transmission gear 37, a second transmission gear 38, and a common output gear 39.

The GT input shaft 31 receives rotational power input from the CVT output shaft 22. The GT input shaft 31 is disposed coaxially with the CVT output shaft 22. The CVT output shaft 22 may be rotatably inserted in the GT input shaft 31. When the clutch 15 described later is disengaged, the GT input shaft 31 is rotatable independently of the CVT output shaft 22, while when the clutch 15 described later is engaged, the GT input shaft 31 corotates with the CVT output shaft 22.

The GT output shaft 32 outputs rotational power to the output mechanism 14. The first GT intermediate shaft 33 transmits rotational power to the GT output shaft 32 from the GT input shaft 31. The second GT intermediate shaft 34 also transmits rotational power to the GT output shaft 32 from the GT input shaft 31. The first GT intermediate shaft 33 is disposed forwardly of the GT input shaft 31, while the second GT intermediate shaft 34 is disposed rearwardly of the GT input shaft 31. That is, the first GT intermediate shaft 33 and the second GT intermediate shaft 34 are opposed with respect to the GT input shaft 31 in the forward/rearward direction. The GT input shaft 31, the GT output shaft 32, the first GT intermediate shaft 33, and the second GT intermediate shaft 34 extend in the leftward/rightward direction.

On the GT input shaft 31 and the first GT intermediate shaft 33 are mounted a plurality of (e.g., two) first speed-change gear pairs 35A and 35B. On the GT input shaft 31 and the second GT intermediate shaft 34 are mounted a plurality of (e.g., two) second speed-change gear pairs 36A and 36B. That is, the speed of the rotation to be transmitted from the GT input shaft 31 is changed through any of the first speed-change gear pairs 35A and 35B and second speed-change gear pairs 36A and 36B, and the rotation at the changed speed is transmitted to the GT output shaft 32. For example, the first speed-change gear pair 35A corresponds to a "third gear position", the first speed-change gear pair 35B corresponds to a "reverse position", the second speed-change gear pair 36A corresponds to a "second gear position", and the second speed-change gear pair 36B corresponds to a "first gear position". The correspondence relationship between the gear pairs and the gear positions is not limited to this example.

The first transmission gear 37 is mounted on the first GT intermediate shaft 33 so as to corotate with the first GT intermediate shaft 33. The second transmission gear 38 is mounted on the second GT intermediate shaft 34 so as to corotate with the second GT intermediate shaft 34. The common output gear 39 is mounted on the GT output shaft 32 so as to corotate with the GT output shaft 32. The first transmission gear 37 and the second transmission gear 38 are aligned with each other in the forward/rearward direction and are in mesh with the common output gear 39.

That is, the rotation of the first GT intermediate shaft 33 is transmitted to the GT output shaft 32 via the first transmission gear 37 and the common output gear 39, and the rotation of the second GT intermediate shaft 34 is transmitted to the GT output shaft 32 via the second transmission gear 38 and the common output gear 39. Thus, a first speed change route passing through the first GT intermediate shaft 33 and a second speed change route passing through the second GT intermediate shaft 34 are arranged in parallel between the GT input shaft 31 and the GT output shaft 32. That is, the rotation of the GT input shaft 31 is transmitted to the GT output shaft 32 through either the first speed change route or the second speed change route.

The clutch 15 is mounted around the axis of the GT input shaft 31. The clutch 15 is configured to disable and enable power transmission from the CVT output shaft 22 to the GT input shaft 31. The clutch 15 is, for example, a multi-plate clutch. The location of the clutch 15 in the leftward/rightward direction overlaps with the location of the first transmission gear 37 and second transmission gear 38 in the leftward/rightward direction.

The output mechanism 14 receives rotational power output by the gear transmission 13 and outputs the rotational power to the drive wheels (front wheels 3 and/or rear wheels 4). The output mechanism 14 includes a final shaft 41 disposed parallel to the GT output shaft 32 and a final gear pair 42 mounted on the GT output shaft 32 and final shaft 41. The final shaft 41 and final gear pair 42 are disposed rearwardly of the GT output shaft 32.

The speed-reduction gear pair 20, first transmission gear 37, clutch 15, second transmission gear 38, and common output gear 39 are arranged in such a manner that their locations in the leftward/rightward direction overlap with one another (their locations in the leftward/rightward direction coincide with one another in FIG. 2). The pump 16, first speed-change gear pair 35A, second speed-change gear pair 36A, and final gear pair 42 are arranged in such a manner that their locations in the leftward/rightward direction overlap with one another (their locations in the leftward/rightward direction coincide with one another in FIG. 2). The first speed-change gear pair 35B and second speed-change gear pair 36B are arranged in such a manner that their locations in the leftward/rightward direction overlap with each other (their locations in the leftward/rightward direction coincide with each other in FIG. 2). That is, in the example of FIG. 2, the gear transmission 13 includes three gear trains.

Figure 3:
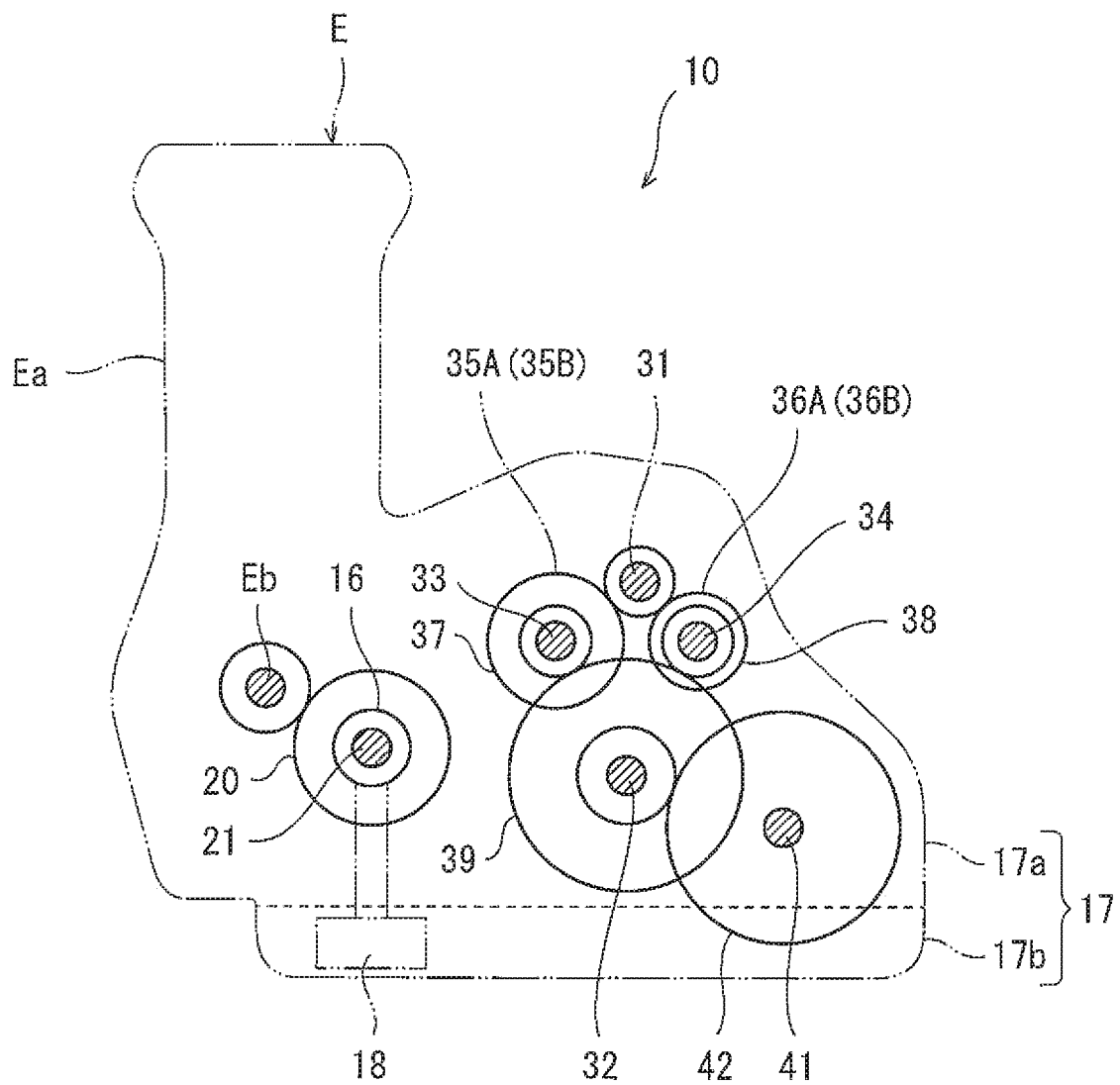
FIG. 3 is a side view of the power unit shown in FIG. 2.

FIG. 3 is a side view of the power unit 10 shown in FIG. 2. As shown in FIG. 3, the power unit 10 includes a power unit case 17 continuous with the rear of the engine E. The power unit case 17 houses the crankshaft Eb, the reduced-speed shaft 11, the continuously variable transmission 12, the gear transmission 13, the output mechanism 14, the clutch 15, and the pump 16. The power unit case 17 includes a case body 17a and an oil pan 17b provided below the case body 17a. The oil pan 17b reserves a lubricating oil, and the lubricating oil is sucked up by the action of suction force of the pump 16 through a strainer 18.

The CVT input shaft 21, and therefore the reduced-speed shaft 11, are disposed rearwardly of the crankshaft Eb. The CVT input shaft 21 is disposed below the crankshaft Eb. The GT input shaft 31, and therefore the CVT output shaft 22, are disposed rearwardly of the CVT input shaft 21. The GT input shaft 31 is disposed above the crankshaft Eb. The first GT intermediate shaft 33 and second GT intermediate shaft 34 are disposed below the GT input shaft 31. The first GT intermediate shaft 33 and second GT intermediate shaft 34 are disposed above the CVT input shaft 21. The first GT intermediate shaft 33 is disposed between the CVT input shaft 21 and the GT input shaft 31.

The GT output shaft 32 is disposed below the first GT intermediate shaft 33 and the second GT intermediate shaft 34. The GT output shaft 32 is disposed rearwardly of the first GT intermediate shaft 33 and forwardly of the second GT intermediate shaft 34. The GT output shaft 32 is disposed below the crankshaft Eb. The final shaft 41 is disposed rearwardly of and below the GT output shaft 32. The speed-reduction gear pair 20 and common output gear 39 are disposed above the oil pan 17b. A part of the final gear pair 42 lies within the oil pan 17b.

Figure 4:
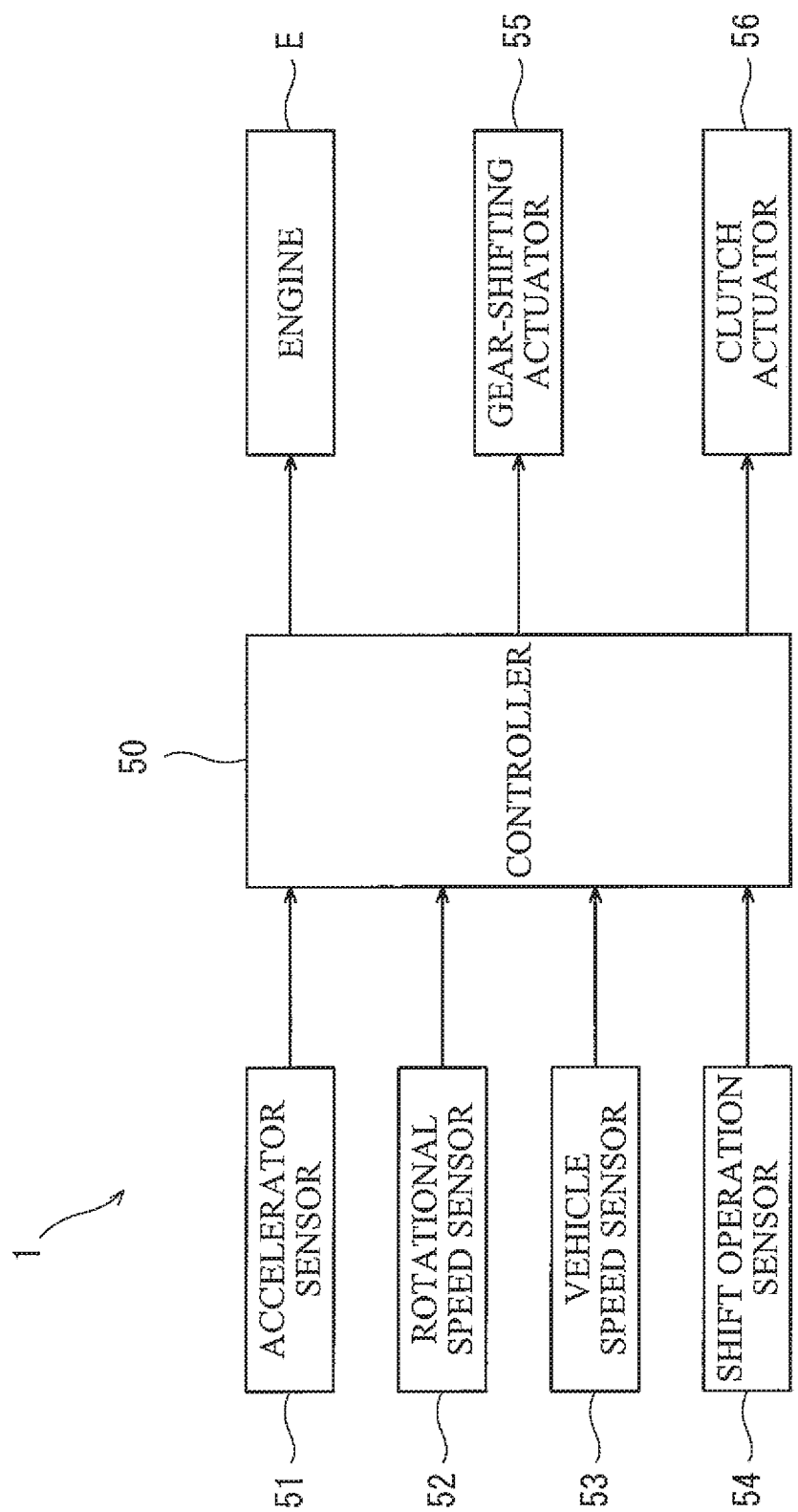
FIG. 4 is a block diagram of a control system for the power unit shown in FIG. 2.

FIG. 4 is a block diagram of a control system for the power unit 10 shown in FIG. 2. The utility vehicle 1 includes a controller 50. The utility vehicle 1 includes an accelerator sensor 51, a rotational speed sensor 52, a vehicle speed sensor 53, and a shift operation sensor 54, which are provided on the input side of the controller 50. The accelerator sensor 51 is a sensor that detects the amount of operation of an acceleration operation member (e.g., an accelerator pedal) by a driver. The rotational speed sensor 52 is a sensor that detects the engine speed (in particular the rotational speed of the crankshaft Eb). The vehicle speed sensor 53 is a sensor that detects the travel speed of the utility vehicle 1. The shift operation sensor 54 is a sensor that detects the position of a gear-shifting operation member (e.g., a shift lever) operated by the driver (gear position command).

The utility vehicle 1 includes the engine E, a gear-shifting actuator 55, and a clutch actuator 56, which are provided on the output side of the controller 50. The gear-shifting actuator 55 generates gear-shifting power for the gear transmission 13. That is, the gear-shifting actuator 55 rotationally drives a shift drum (not illustrated) to move shift forks (not illustrated) and hence dogs (not illustrated), thereby accomplishing a gear-shifting process. The gear-shifting actuator 55 is, for example, an electric motor. The clutch actuator 56 generates power for actuating the clutch 15. For example, the clutch 15 is a clutch actuated by hydraulic pressure, and the clutch actuator 56 is a hydraulic pump.

The controller 50 controls the engine E based on detection signals received from the accelerator sensor 51, rotational speed sensor 52, and vehicle speed sensor 53. The controller 50 controls the gear-shifting actuator 55 and clutch actuator 56 based on detection signals received from the shift operation sensor 54. Upon receiving a gear position command from the shift operation sensor 54, the controller 50 controls the clutch actuator 56 to bring the clutch 15 into a disengaged state. Subsequently, the controller 50 controls the gear-shifting actuator 55 in such a manner that a desired speed-change gear pair is selected from the first speed-change gear pairs 35A and 35B and second speed-change gear pairs 36A and 36B. Next, the controller 50 controls the clutch actuator 56 to bring the clutch 15 back into an engaged state. Upon receiving a neutral position command from the shift operation sensor 54, the controller 50 controls the clutch actuator 56 to bring the clutch 15 into a disengaged state.

With the configuration described above, the electricity generator G is disposed with high space efficiency, and the power unit 10 can be made compact in the leftward/rightward direction. Additionally, since the electricity generator G is disposed upstream of the continuously variable transmission 12 in the route of power transmission from the engine E to the drive wheels, back torque exerted on the drive wheels (front wheels 3 and/or rear wheels 4) from the ground surface is absorbed by the belt 25 of the continuously variable transmission 12, and transmission of the back torque to the electricity generator G can be reduced. This makes it possible to increase the service life of the electricity generator G while preventing size increase of the power unit 10.

Additionally, since the electricity generator G is mounted on an end of the reduced-speed shaft 11 and the pump 16 is disposed between the drive pulley 23 and the electricity generator G, the electricity generator G and pump 16 are disposed with high space efficiency, and the power unit 10 can be made compact in the leftward/rightward direction.

Additionally, since the electricity generator G is disposed between the crankshaft Eb and the gear transmission 13 in the forward/rearward direction, the space lying between the engine E and the gear transmission 13 can be effectively used to dispose the electricity generator G with high space efficiency, and the power unit 10 can be made compact in the forward/rearward direction.

Additionally, by virtue of the carefully designed layout in which the gear transmission 13 is configured to include the plurality of GT intermediate shafts 33 and 34 and in which the electricity generator G is mounted on the reduced-speed shaft 11, the power unit 10 can be made compact in the leftward/rightward direction.

Additionally, since the first transmission gear 37 and the second transmission gear 38 are aligned with each other in the forward/rearward direction and are in mesh with the common output gear 39, the size of the space occupied by the first transmission gear 37, second transmission gear 38, and common output gear 39 can be reduced in the leftward/rightward direction, and the power unit 10 can be made compact in the leftward/rightward direction.

Additionally, since the location of the speed-reduction gear pair 20 in the leftward/rightward direction overlaps with the location of the first transmission gear 37 and second transmission gear 38 in the leftward/rightward direction, the gears are disposed with high space efficiency, and the power unit 10 can be made compact in the leftward/rightward direction.

Second Embodiment

Figure 5:
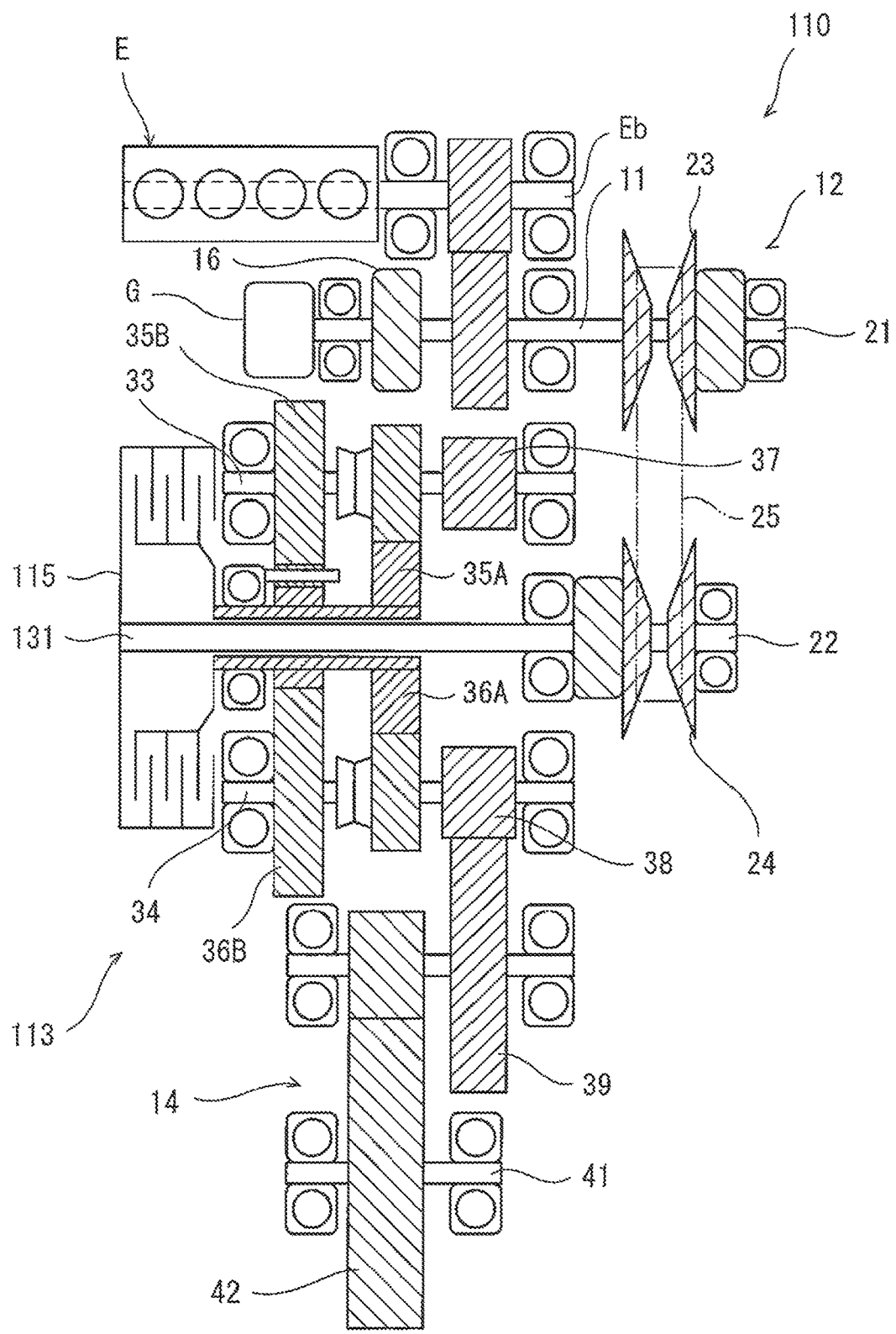
FIG. 5 shows a power unit of a second embodiment in the same manner as FIG. 2 shows the power unit of the first embodiment.

FIG. 5 shows a power unit 110 of a second embodiment in the same manner as FIG. 2 shows the power unit of the first embodiment. The elements identical to those of the first embodiment are denoted by the same reference signs and will not be described again. As seen from FIG. 5, the difference of the power unit 110 of the second embodiment from the power unit of the first embodiment lies in how a clutch 115 is disposed. The power unit 110 includes a GT input shaft 131, which is longer than the corresponding shaft of the first embodiment. The GT input shaft 131 projects beyond the first GT intermediate shaft 33 and the second GT intermediate shaft 34 on a side (left side in FIG. 5) remote from the continuously variable transmission 12 in the leftward/rightward direction.

The clutch 115 is mounted on an end (left end in FIG. 5) of the GT input shaft 131, the end being remote from the continuously variable transmission 12. The clutch 115 is disposed at a location displaced from the first GT intermediate shaft 33 and second GT intermediate shaft 34 in the leftward/rightward direction. The clutch 115 has a larger diameter than the corresponding clutch of the first embodiment. The clutch 115, as viewed in the leftward/rightward direction, overlaps with the first GT intermediate shaft 33 and second GT intermediate shaft 34. With this configuration, the first GT intermediate shaft 33 and second GT intermediate shaft 34 can be disposed close to the GT input shaft 131 in the forward/rearward direction despite the presence of the clutch 115, and the power unit 110 can be made compact in the forward/rearward direction. The electricity generator G is disposed inwardly of the outer edge of the clutch 115 in the leftward/rightward direction. That is, the clutch 115 is located outwardly of the electricity generator G in the leftward/rightward direction. The other elements are the same as those of the first embodiment described above and will therefore not be described again.

Third Embodiment

Figure 6:
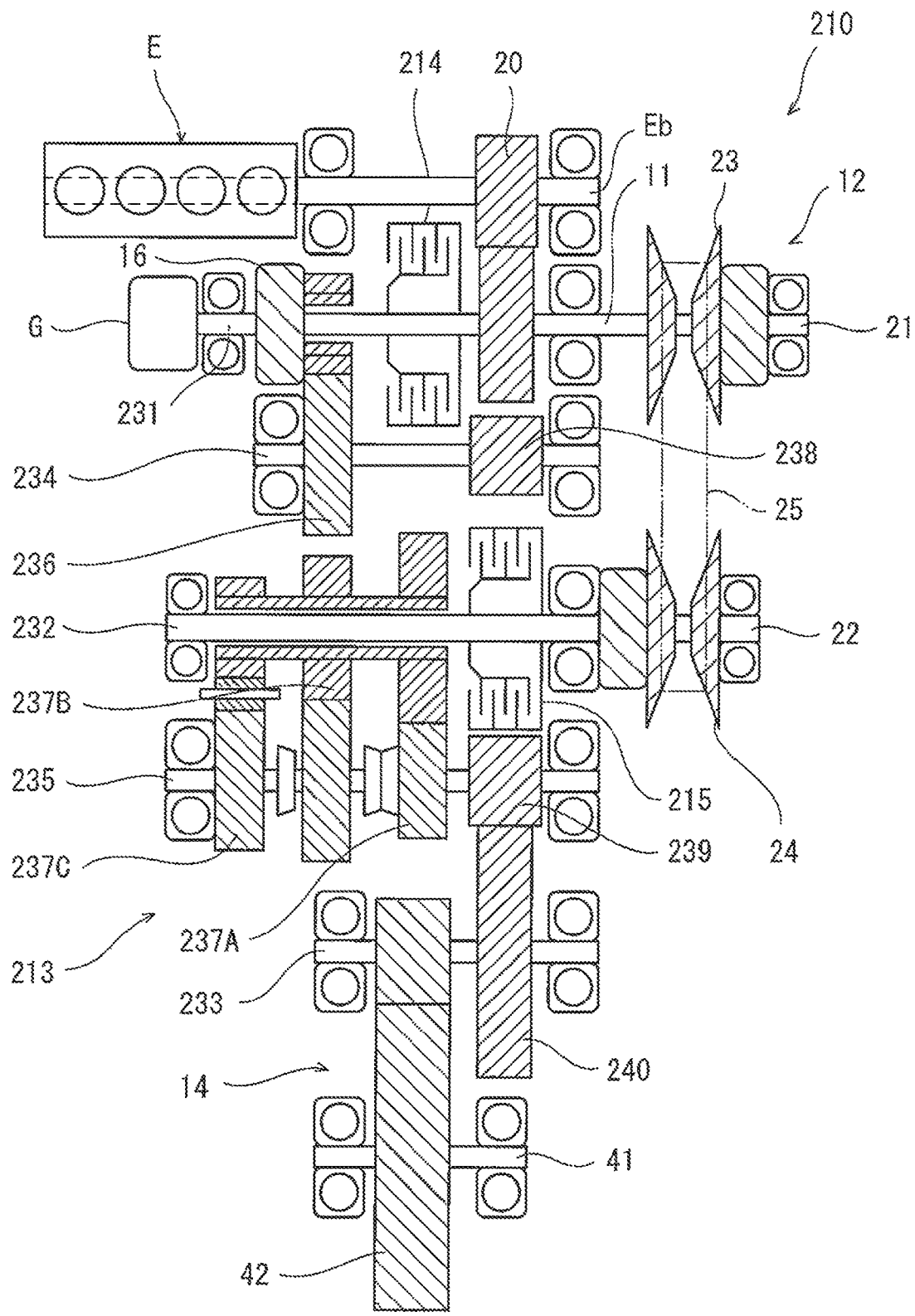
FIG. 6 is a developed view of a power unit of a third embodiment.

FIG. 6 is a developed view of a power unit 210 of a third embodiment. The elements identical to those of the first embodiment are denoted by the same reference signs and will not be described again. As shown in FIG. 6, the power unit 210 includes the engine E (power source for travel of the utility vehicle), the continuously variable transmission 12, a gear transmission 213, a first clutch 214, a second clutch 215, the output mechanism 14, the pump 16, and the power unit case 17.

The gear transmission 213 is aligned with the continuously variable transmission 12 in the leftward/rightward direction and aligned with the engine E in the forward/rearward direction. Specifically, the gear transmission 213 is disposed on the left of the continuously variable transmission 12 and rearwardly of the engine E. The gear transmission 213 is a dog clutch transmission. The gear transmission 213 includes a first GT input shaft 231, a second GT input shaft 232, a GT output shaft 233, a first GT intermediate shaft 234, a second GT intermediate shaft 235, a first speed-change gear pair 236, second speed-change gear pairs 237A, 237B, and 237C, a first transmission gear 238, a second transmission gear 239, and a common output gear 240. The first GT input shaft 231, the second GT input shaft 232, the GT output shaft 233, the first GT intermediate shaft 234, and the second GT intermediate shaft 235 extend in the leftward/rightward direction.

The first GT input shaft 231 is disposed coaxially with the reduced-speed shaft 11 and the CVT input shaft 21. The first GT input shaft 231 may be rotatably inserted in the reduced-speed shaft 11. When the first clutch 214 described later is disengaged, the first GT input shaft 231 is rotatable independently of the reduced-speed shaft 11, while when the first clutch 214 described later is engaged, the first GT input shaft 231 corotates with the reduced-speed shaft 11.

On the first GT input shaft 231 there is mounted the pump 16. That is, the pump 16 is driven by rotation of the first GT input shaft 231. The location of the pump 16 in the leftward/rightward direction overlaps with the location of the crankshaft Eb in the leftward/rightward direction. The pump 16 is mounted on the first GT input shaft 231. Any part of the pump 16 does not project outwardly of the crankshaft Eb in the leftward/rightward direction. The pump 16 is disposed between the electricity generator G and first clutch 214, which will be described later, in the leftward/rightward direction.

The electricity generator G is mounted on an end of the first GT input shaft 231, the end being remote from the continuously variable transmission 12. The electricity generator G is aligned with the engine E in the forward/rearward direction. The electricity generator G is disposed between the crankshaft Eb and the gear transmission 13 in the forward/rearward direction. The location of the electricity generator G in the leftward/rightward direction overlaps with the location of the crankshaft Eb in the leftward/rightward direction. Any part of the electricity generator G does not project outwardly of the crankshaft Eb in the leftward/rightward direction. The electricity generator G only needs to be mounted on a shaft assembly including the reduced-speed shaft 11, CVT input shaft 21, and first GT input shaft 231 and may be mounted, for example, on the reduced-speed shaft 11 or on the CVT input shaft 21.

The second GT input shaft 232 receives rotational power input from the CVT output shaft 22. The second GT input shaft 232 is disposed coaxially with the CVT output shaft 22. The CVT output shaft 22 may be rotatably inserted in the second GT input shaft 232. When the second clutch 215 described later is disengaged, the second GT input shaft 232 is rotatable independently of the CVT output shaft 22, while when the second clutch 215 described later is engaged, the second GT input shaft 232 corotates with the CVT output shaft 22.

The GT output shaft 233 outputs rotational power to the output mechanism 14. The first GT intermediate shaft 234 transmits rotational power from the first GT input shaft 231 to the GT output shaft 233. The first GT intermediate shaft 234 is disposed rearwardly of the first GT input shaft 231 and forwardly of the second GT input shaft 232. At least one first speed-change gear pair 236 (in FIG. 6, one first speed-change gear pair) is mounted on the first GT input shaft 231 and the first GT intermediate shaft 234.

The first clutch 214 is mounted around the axis of the first GT input shaft 231. The first clutch 214 is interposed between the engine E and the gear transmission 213. The first clutch 214 is configured to disable and enable power transmission from the reduced-speed shaft 11 to the first GT input shaft 231. The first clutch 214 is, for example, a multi-plate clutch. The first clutch 214 is disposed between the speed-reduction gear pair 20 and the first speed-change gear pair 236 in the leftward/rightward direction.

The second GT intermediate shaft 235 transmits rotational power from the second GT input shaft 232 to the GT output shaft 233. The second GT intermediate shaft 235 is disposed rearwardly of the second GT input shaft 231. On the second GT input shaft 232 and the second GT intermediate shaft 235 are mounted a plurality of (e.g., three) second speed-change gear pairs 237A, 237B, and 237C.

The second clutch 215 is mounted around the axis of the second GT input shaft 232. The second clutch 215 is interposed between the continuously variable transmission 12 and the gear transmission 213. The second clutch 215 is configured to disable and enable power transmission from the CVT output shaft 22 to the second GT input shaft 232. The second clutch 215 is, for example, a multi-plate clutch. The second clutch 215 is disposed between the driven pulley 24 and the second speed-change gear pairs 237A, 237B, and 237C in the leftward/rightward direction. The location of the second clutch 215 in the leftward/rightward direction overlaps with the location of the second transmission gear 239 in the leftward/rightward direction.

When the first clutch 214 is in an engaged state and the second clutch 215 is in a disengaged state, rotational power transmitted from the crankshaft Eb to the reduced-speed shaft 11 is transmitted to the first GT input shaft 231, undergoes a speed change provided by the first speed-change gear pair 236, and is then transmitted to the GT output shaft 232. Meanwhile, rotational power transmitted from the reduced-speed shaft 11 to the CVT input shaft 21 is cut off by the second clutch 215 and is not transmitted to the second GT input shaft 232.

When the first clutch 214 is in a disengaged state and the second clutch 215 is in an engaged state, rotational power transmitted from the crankshaft Eb to the reduced-speed shaft 11 is transmitted to the continuously variable transmission 12, undergoes a continuous speed change, and is then transmitted to the second GT input shaft 232. Meanwhile, rotational power of the reduced-speed shaft 11 is cut off by the first clutch 214 and is not transmitted to the first GT input shaft 231. The rotation of the second GT input shaft 233 undergoes a speed change provided by any of the second speed-change gear pairs 237A, 237B, and 237C and is then transmitted to the GT output shaft 232. For example, when the continuously variable transmission 12 is in operation for speed change, the second speed-change gear pairs 237A, 237B, and 237C correspond to a "low gear position", a "high gear position", and a "reverse position", respectively. The first speed-change gear pair 236 corresponds to a gear position used at lower speeds than the low gear position, a gear position between the low and high gear positions, or a gear position used at higher speeds than the high gear position. The correspondence relationship between the gear pairs and the gear positions is not limited to this example.

The first transmission gear 238 is mounted on the first GT intermediate shaft 234 so as to corotate with the first GT intermediate shaft 234. The second transmission gear 239 is mounted on the second GT intermediate shaft 235 so as to corotate with the second GT intermediate shaft 235. The common output gear 240 is mounted on the GT output shaft 233 so as to corotate with the GT output shaft 233. The first transmission gear 238 and the second transmission gear 239 are aligned with each other in the forward/rearward direction and are in mesh with the common output gear 240.

That is, the rotation of the first GT intermediate shaft 234 is transmitted to the GT output shaft 233 via the first transmission gear 238 and the common output gear 240, and the rotation of the second GT intermediate shaft 235 is transmitted to the GT output shaft 233 via the second transmission gear 239 and the common output gear 240. Thus, a first speed change route passing through the first GT input shaft 231 and first GT intermediate shaft 234 and a second speed change route passing through the continuously variable transmission 12, second GT input shaft 232, and second GT intermediate shaft 235 are arranged in parallel between the reduced-speed shaft 11 and the GT output shaft 233. That is, the rotation of the GT input shaft 231 is transmitted to the GT output shaft 232 through either the first speed change route or the second speed change route.

The speed-reduction gear pair 20, first transmission gear 238, second clutch 215, second transmission gear 239, and common output gear 240 are arranged in such a manner that their locations in the leftward/rightward direction overlap with one another (their locations in the leftward/rightward direction coincide with one another in FIG. 6). The first clutch 214, second speed-change gear pair 237A, and final gear pair 42 are arranged in such a manner that their locations in the leftward/rightward direction overlap with one another (their locations in the leftward/rightward direction coincide with one another in FIG. 6). The first speed-change gear pair 236 and second speed-change gear pair 237B are arranged in such a manner that their locations in the leftward/rightward direction overlap with each other (their locations in the leftward/rightward direction coincide with each other in FIG. 6). The pump 16 and second speed-change gear pair 237C are arranged in such a manner that their locations in the leftward/rightward direction overlap with each other (their locations in the leftward/rightward direction coincide with each other in FIG. 6). That is, in the example of FIG. 6, the gear transmission 213 includes four gear trains.

Figure 7:
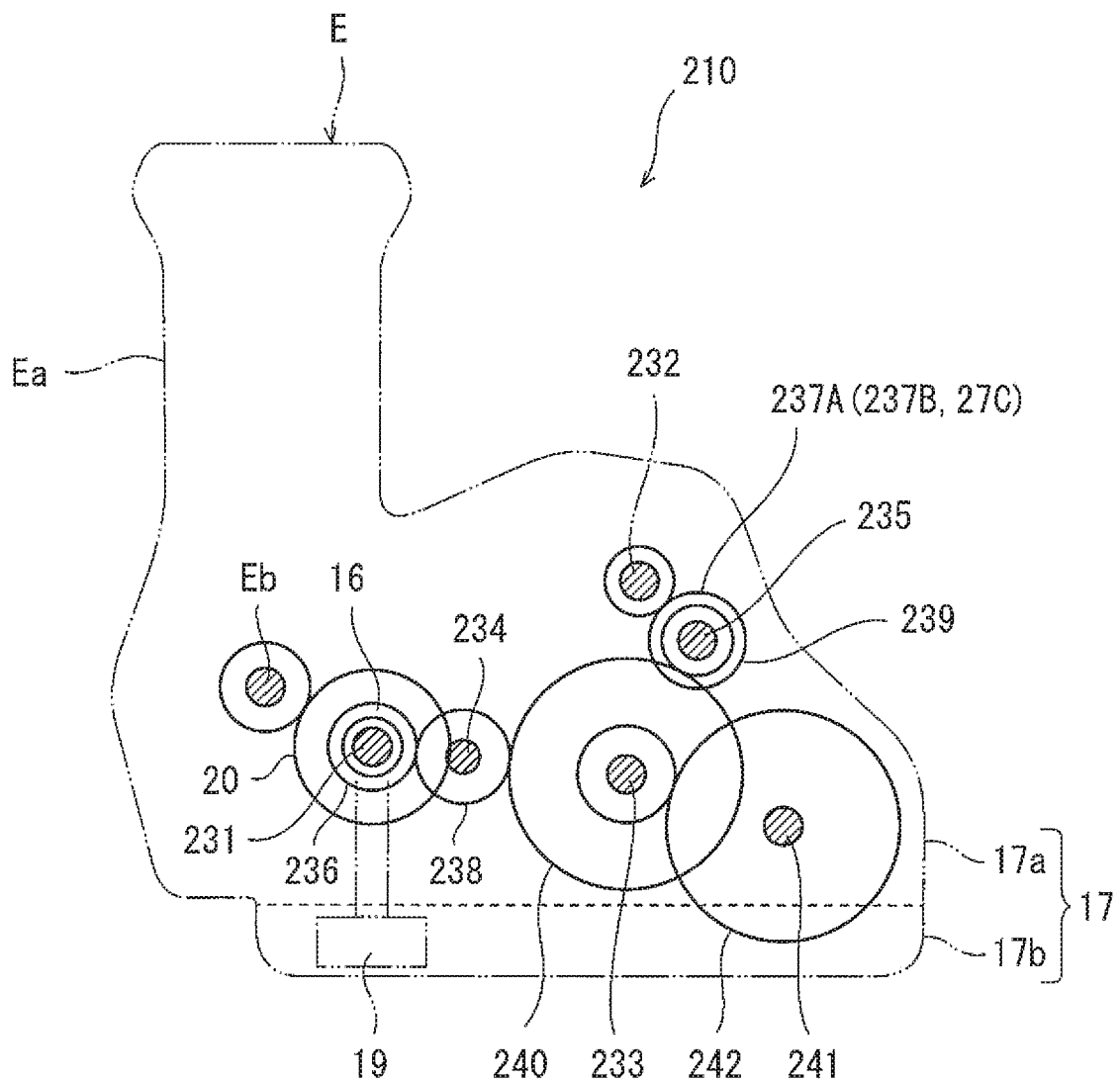
FIG. 7 is a side view of the power unit shown in FIG. 6.

FIG. 7 is a side view of the power unit 210 shown in FIG. 6. As shown in FIG. 7, the first GT input shaft 231, and therefore the reduced-speed shaft 11 and CVT input shaft 21, are disposed rearwardly of the crankshaft Eb. The first GT input shaft 231 is disposed below the crankshaft Eb. The second GT input shaft 232, and therefore the CVT output shaft 22, are disposed rearwardly of the first GT input shaft 231 and CVT input shaft 221. The second GT input shaft 232 is disposed above the crankshaft Eb. The first GT intermediate shaft 234 is disposed rearwardly of the first GT input shaft 231. The first GT intermediate shaft 234 is disposed below the first GT input shaft 231. The second GT intermediate shaft 235 is disposed below the second GT input shaft 232. The second GT intermediate shaft 235 is disposed above the crankshaft Eb and first GT input shaft 231.

The GT output shaft 233 is disposed below the second GT intermediate shaft 235. The GT output shaft 233 is disposed rearwardly of the first GT intermediate shaft 234. The GT output shaft 233 is disposed forwardly of the first GT intermediate shaft 234. The GT output shaft 233 is disposed below the crankshaft Eb. The final shaft 41 is disposed rearwardly of and below the GT output shaft 233. The speed-reduction gear pair 20 and common output gear 240 are disposed above the oil pan 17b. A part of the final gear pair 42 lies within the oil pan 17b.

Figure 8:
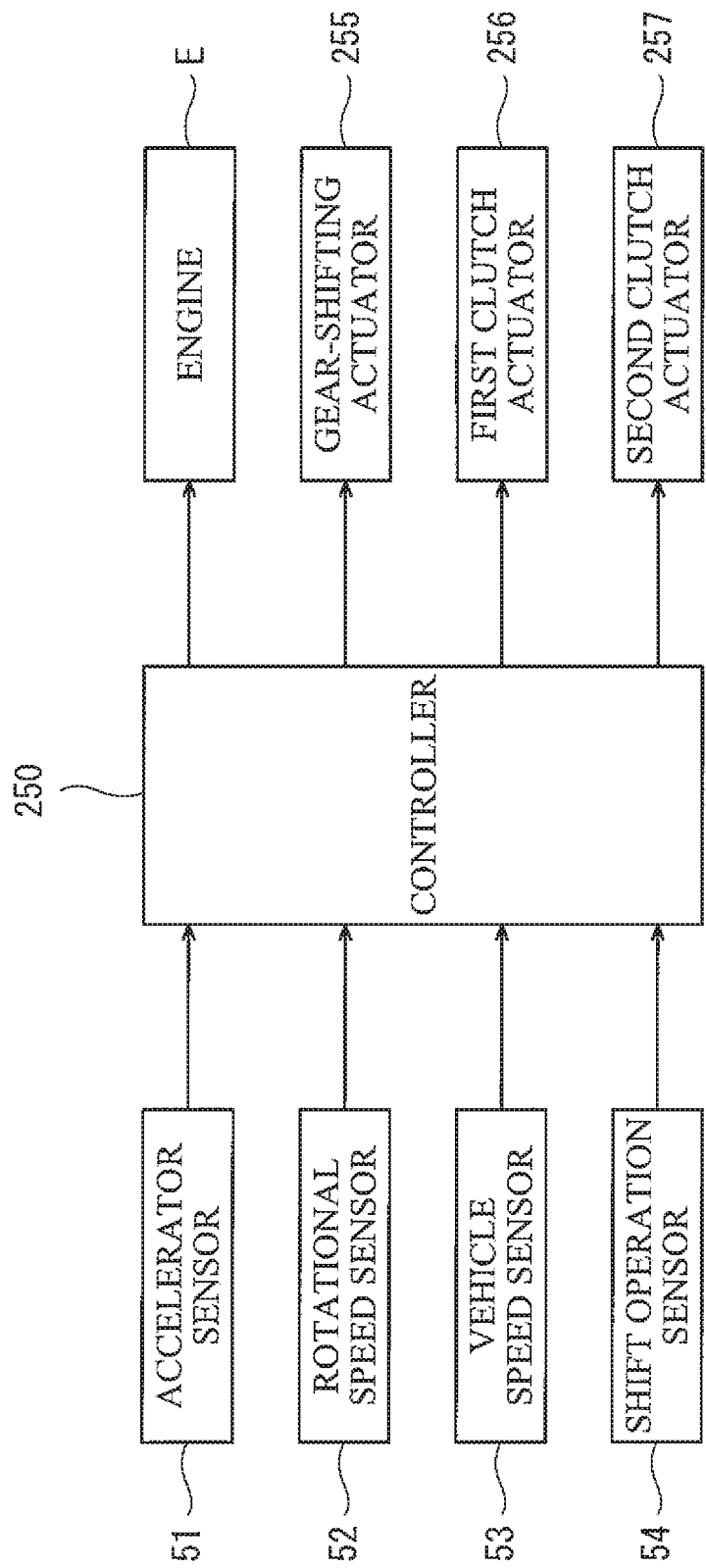
FIG. 8 is a block diagram of a control system for the power unit shown in FIG. 6.

FIG. 8 is a block diagram of a control system for the power unit 210 shown in FIG. 6. The utility vehicle includes a controller 250. The utility vehicle includes the accelerator sensor 51, the rotational speed sensor 52, the vehicle speed sensor 53, and the shift operation sensor 54, which are provided on the input side of the controller 250. The utility vehicle includes the engine E, a gear-shifting actuator 255, a first clutch actuator 256, and a second clutch actuator 257, which are provided on the output side of the controller 250. The gear-shifting actuator 255 generates gear-shifting power for the gear transmission 213. The first clutch actuator 256 generates power for actuating the first clutch 214. The second clutch actuator 257 generates power for actuating the second clutch 215. For example, the first and second clutches 214 and 215 are clutches actuated by hydraulic pressure, and the first and second clutch actuators 256 and 257 are hydraulic pumps.

The controller 250 controls the engine E based on detection signals received from the accelerator sensor 51, rotational speed sensor 52, and vehicle speed sensor 53. The controller 250 controls the gear-shifting actuator 255, first clutch actuator 256, and second clutch actuator 257 based on detection signals received from the shift operation sensor 54. Upon receiving a neutral position command from the shift operation sensor 54, the controller 250 controls the first and second clutch actuators 256 and 257 to bring the first and second clutches 214 and 215 into a disengaged state.

Upon receiving a gear position command from the shift operation sensor 54, the controller 250 controls the first and second clutch actuators 256 and 257 to bring the first and second clutches 214 and 215 into a disengaged state. Subsequently, the controller 250 controls the gear-shifting actuator 255 in such a manner that a desired speed-change gear pair is selected from the first speed-change gear pair 236 and second speed-change gear pairs 237A, 237B, and 237C. Next, the controller 250 controls the first clutch actuator 256 or the second clutch actuator 257 in such a manner that one of the first and second clutches 214 and 215 that is located upstream of the selected speed-change gear pair is brought back into an engaged state. That is, the other of the first and second clutches 214 and 215, which is not located upstream of the selected speed-change gear pair, remains in a disengaged state.

With the configuration described above, the electricity generator G is disposed with high space efficiency, and the power unit 210 can be made compact in the leftward/rightward direction. Additionally, since the electricity generator G is disposed upstream of the continuously variable transmission 12 in the route of power transmission from the engine E to the drive wheels (front wheels 3 and/or rear wheels 4), back torque exerted on the drive wheels from the ground surface is absorbed by the belt 25 of the continuously variable transmission 12, and transmission of the back torque to the electricity generator G can be reduced. This makes it possible to increase the service life of the electricity generator G while preventing size increase of the power unit 210.

Additionally, since the electricity generator G is mounted on an end of the first GT input shaft 231 and the pump 16 is disposed between the drive pulley 23 and the electricity generator G, the electricity generator G and pump 16 are disposed with high space efficiency, and the power unit 210 can be made compact in the leftward/rightward direction.

Additionally, since the electricity generator G is disposed between the crankshaft Eb and the gear transmission 213 in the forward/rearward direction, the space lying between the engine E and the gear transmission 213 can be effectively used to dispose the electricity generator G with high space efficiency, and the power unit 210 can be made compact in the forward/rearward direction.

Additionally, since the gear transmission 213 is configured as described above and the electricity generator G is mounted on the first GT input shaft 231, selective use of the two power transmission routes in the gear transmission 213 is enabled. Thus, the gear ratio range of the power unit 210 can be widened, and at the same time the electricity generator G can be disposed with high space efficiency.

Additionally, since the first transmission gear 238 and second transmission gear 239 are aligned with each other in the forward/rearward direction and are in mesh with the common output gear 240, the size of the space occupied by the first transmission gear 238, second transmission gear 239, and common output gear 240 can be reduced in the leftward/rightward direction, and the power unit 210 can be made compact in the leftward/rightward direction.

Additionally, since the location of the first clutch 214 in the leftward/rightward direction overlaps with the location of the first transmission gear 238 in the leftward/rightward direction, the first clutch is disposed with high space efficiency, and the power unit 210 can be made compact in the leftward/rightward direction.

Additionally, the location of the second clutch 215 in the leftward/rightward direction overlaps with the location of the second transmission gear 239 in the leftward/rightward direction, the second clutch 215 is disposed with high space efficiency, and the power unit 210 can be made compact in the leftward/rightward direction.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A power unit of a utility vehicle, comprising:
a power source for travel of the utility vehicle, the power source comprising a drive shaft that outputs rotational power;
a continuously variable transmission comprising a CVT input shaft that receives the rotational power input from the drive shaft of the power source, a CVT output shaft that outputs the rotational power, a drive pulley mounted on the CVT input shaft, a driven pulley mounted on the CVT output shaft, and a belt wound around the drive pulley and the driven pulley;
a reduced-speed shaft disposed parallel to the drive shaft of the power source and coaxially with the CVT input shaft;
speed-reduction gears that transmit the rotational power of the drive shaft to the reduced-speed shaft; and
an electricity generator mounted on a shaft assembly including the CVT input shaft and the reduced-speed shaft, wherein
the drive shaft, the shaft assembly, the CVT input shaft, and the CVT output shaft extend in a first direction,
the electricity generator is aligned with the power source in a second direction perpendicular to the first direction, and
the location of the electricity generator in the first direction overlaps with the location of the power source in the first direction.

2. The power unit according to claim 1, further comprising a pump driven by the shaft assembly, wherein
the electricity generator is mounted on an end of the shaft assembly, the end being remote from the CVT input shaft, and
the pump is disposed between the drive pulley and the electricity generator.

3. The power unit according to claim 1, further comprising:
a gear transmission that receives rotational power output by the power source or the continuously variable transmission; and
an output mechanism that receives rotational power output by the gear transmission and that outputs the rotational power to a drive wheel, wherein
the gear transmission is aligned with the continuously variable transmission in the first direction and aligned with the power source in the second direction, and
the electricity generator is disposed between the drive shaft and the gear transmission in the second direction.

4. The power unit according to claim 3, wherein
the gear transmission comprises:
a GT input shaft that receives the rotational power input from the CVT output shaft;
a GT output shaft that outputs the rotational power to the output mechanism;
a first GT intermediate shaft that transmits the rotational power from the GT input shaft to the GT output shaft;
a second GT intermediate shaft that transmits the rotational power from the GT input shaft to the GT output shaft;
first speed-change gears mounted on the GT input shaft and the first GT intermediate shaft;
second speed-change gears mounted on the GT input shaft and the second GT intermediate shaft;
a first transmission gear mounted on the first GT intermediate shaft to provide power transmission to the GT output shaft; and
a second transmission gear mounted on the second GT intermediate shaft to provide power transmission to the GT output shaft,
the drive shaft, the CVT input shaft, the CVT output shaft, the GT input shaft, the first GT intermediate shaft, the second GT intermediate shaft, and the GT output shaft extend in the first direction,
the first GT intermediate shaft is disposed on one side with respect to the GT input shaft in the second direction,
the second GT intermediate shaft is disposed on the other side with respect to the GT input shaft in the second direction, and
the electricity generator is mounted on the reduced-speed shaft.

5. The power unit according to claim 4, wherein
the gear transmission comprises a common output gear mounted on the GT output shaft, and
the first transmission gear and the second transmission gear are aligned with each other in the second direction and are in mesh with the common output gear.

6. The power unit according to claim 5, wherein the location of the speed-reduction gears in the first direction overlaps with the location of the first transmission gear and the second transmission gear in the first direction.

7. The power unit according to claim 1, further comprising:
a first clutch interposed between the power source and the gear transmission; and
a second clutch interposed between the continuously variable transmission and the gear transmission, wherein
the gear transmission comprises:
a first GT input shaft that receives the rotational power input from the reduced-speed shaft, the first GT input shaft being disposed coaxially with the CVT input shaft and the reduced-speed shaft;
a second GT input shaft that receives the rotational power input from the CVT output shaft;
a GT output shaft that outputs the rotational power to the output mechanism;
a first GT intermediate shaft that transmits the rotational power from the first GT input shaft to the GT output shaft;
a second GT intermediate shaft that transmits the rotational power from the second GT input shaft to the GT output shaft;
first speed-change gears mounted on the first GT input shaft and the first GT intermediate shaft;
second speed-change gears mounted on the second GT input shaft and the second GT intermediate shaft;
a first transmission gear mounted on the first GT intermediate shaft to provide power transmission to the GT output shaft; and
a second transmission gear mounted on the second GT intermediate shaft to provide power transmission to the GT output shaft,
the first clutch is configured to disable power transmission from the power source to the first GT input shaft,
the second clutch is configured to disable power transmission from the CVT output shaft to the second GT input shaft,
the shaft assembly further includes the first GT input shaft in addition to the CVT input shaft and the reduced-speed shaft, and
the electricity generator is mounted on the first GT input shaft.

8. The power unit according to claim 7, wherein
the gear transmission comprises a common output gear mounted on the GT output shaft, and
the first transmission gear and the second transmission gear are aligned with each other in the second direction and are in mesh with the common output gear.

9. The power unit according to claim 7, wherein
the first clutch is mounted around an axis of the first GT input shaft, and the location of the first clutch in the first direction overlaps with the first transmission gear in the first direction.

10. The power unit according to claim 7, wherein
the second clutch is mounted around an axis of the second GT input shaft, and
the location of the second clutch in the first direction overlaps with the location of the second transmission gear in the first direction.

* * * * *